US008497425B2

(12) United States Patent
Morrow

(10) Patent No.: US 8,497,425 B2
(45) Date of Patent: *Jul. 30, 2013

(54) TONEABLE CONDUIT WITH HEAT TREATED TONE WIRE

(75) Inventor: Jason Morrow, Taylorsville, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/886,165

(22) Filed: Sep. 20, 2010

(65) Prior Publication Data

US 2011/0005802 A1    Jan. 13, 2011

Related U.S. Application Data

(63) Continuation-in-part of application No. 10/830,754, filed on Apr. 23, 2004, now Pat. No. 7,820,090, which is a continuation of application No. 10/158,810, filed on May 30, 2002, now abandoned, which is a continuation-in-part of application No. 09/989,289, filed on Nov. 20, 2001, now Pat. No. 7,361,835.

(51) Int. Cl.
    *H02G 3/04*    (2006.01)

(52) U.S. Cl.
    USPC ........... 174/68.1; 174/98; 174/481; 174/72 R; 138/104

(58) Field of Classification Search
    USPC ............ 174/68.1, 68.3, 135, 480, 481, 97, 174/72 R, 112, 104, 110, 37, 650, 95, 96, 174/21 R, 21 C, 101; 138/104, 110, 132, 138/140; 248/68.1; 52/287.1; 324/326, 66, 324/67; 264/171.26, 171.1, 172.12, 172.15; 385/106

See application file for complete search history.

(56) References Cited

U.S. PATENT DOCUMENTS

| 2,647,160 A | 7/1953 | Hood |
| 2,722,237 A | 11/1955 | Rosel |
| 3,086,557 A | 4/1963 | Peterson |

(Continued)

FOREIGN PATENT DOCUMENTS

| DE | 2248441 | 4/1974 |
| EP | 159307 | 10/1985 |

(Continued)

OTHER PUBLICATIONS

Toneable Duct—Specialized Locatable Duct, Product brochure, Sep. 1998, Pyramid Industries, Inc., 100 State St, Suite 200, Erie, PA.

(Continued)

*Primary Examiner* — Angel R Estrada
(74) *Attorney, Agent, or Firm* — Muncy, Geissler, Olds & Lowe PLLC

(57) ABSTRACT

A toneable conduit includes an elongate polymeric tube having a sidewall with an interior surface and an exterior surface. The interior surface defines a main channel for holding communication or power cables. A sub-channel extends longitudinally between the exterior and interior surfaces of the tube. An electrically continuous, toning signal wire is located within the sub-channel. The toning signal wire is formed of an annealed metal or metals and is capable of elongation to a certain extent without breakage, wherein the certain extent approximates or exceeds the extent of elongation of the tube at the point of failure.

19 Claims, 9 Drawing Sheets

U.S. PATENT DOCUMENTS

| | | |
|---|---|---|
| 3,367,370 A | 2/1968 | Sherlock |
| 3,383,456 A | 5/1968 | Kosak |
| 3,555,170 A | 1/1971 | Petzetakis |
| 3,580,983 A | 5/1971 | Jackson |
| 3,713,947 A | 1/1973 | Hawkins |
| 3,748,371 A | 7/1973 | Krook et al. |
| 4,109,941 A | 8/1978 | Wood et al. |
| 4,817,673 A | 4/1989 | Zoghby et al. |
| 5,006,806 A | 4/1991 | Rippingale et al. |
| 5,017,873 A | 5/1991 | Rippingale et al. |
| 5,045,368 A | 9/1991 | Cosman et al. |
| 5,051,034 A | 9/1991 | Goodman |
| 5,061,823 A | 10/1991 | Carroll |
| 5,114,517 A | 5/1992 | Rippingale et al. |
| 5,212,349 A | 5/1993 | Pelzer |
| 5,227,103 A | 7/1993 | Muschiatti |
| 5,243,128 A | 9/1993 | Marcoz |
| RE34,701 E | 8/1994 | Goodman |
| 5,415,242 A | 5/1995 | Pelzer |
| 5,532,598 A | 7/1996 | Clark, Jr. et al. |
| 5,812,358 A | 9/1998 | Kawai et al. |
| 5,998,081 A | 12/1999 | Morrison et al. |
| 6,005,191 A | 12/1999 | Tzeng et al. |
| 6,053,457 A | 4/2000 | Ozga et al. |
| 6,068,426 A | 5/2000 | Blanquet et al. |
| 6,092,558 A | 7/2000 | Maccario |
| 6,105,649 A | 8/2000 | Levingston et al. |
| 6,131,265 A | 10/2000 | Bird |
| 6,135,159 A | 10/2000 | Karl |
| 6,139,068 A | 10/2000 | Burress et al. |
| 6,139,957 A | 10/2000 | Craton |
| 6,933,438 B1 | 8/2005 | Watts et al. |
| 7,279,643 B2 | 10/2007 | Morrow et al. |
| 7,361,835 B2 | 4/2008 | Morrow et al. |
| 7,820,090 B2 * | 10/2010 | Morrow et al. .......... 264/171.26 |
| 7,880,087 B2 * | 2/2011 | Morrow ....................... 174/68.1 |
| 8,280,209 B2 * | 10/2012 | Bollinger et al. ............. 385/106 |
| 2003/0094298 A1 | 5/2003 | Morrow et al. |
| 2004/0262023 A1 | 12/2004 | Morrow et al. |

FOREIGN PATENT DOCUMENTS

| | | |
|---|---|---|
| EP | 0449795 | 10/1991 |
| GB | 2197419 | 5/1988 |
| JP | 05-106765 | 4/1993 |
| JP | 05-106766 | 4/1993 |
| JP | 05-106779 | 4/1993 |
| RU | 2246068 | 4/2000 |
| WO | WO 96/15894 | 5/1996 |

OTHER PUBLICATIONS

Article from www.duraline.com regarding tracer product dated Aug. 8, 2001.

Advertisement by Pyramid Industries, Inc. regarding the Toneable Duct Product. Publication date unknown but prior to Aug. 7, 2001.

* cited by examiner

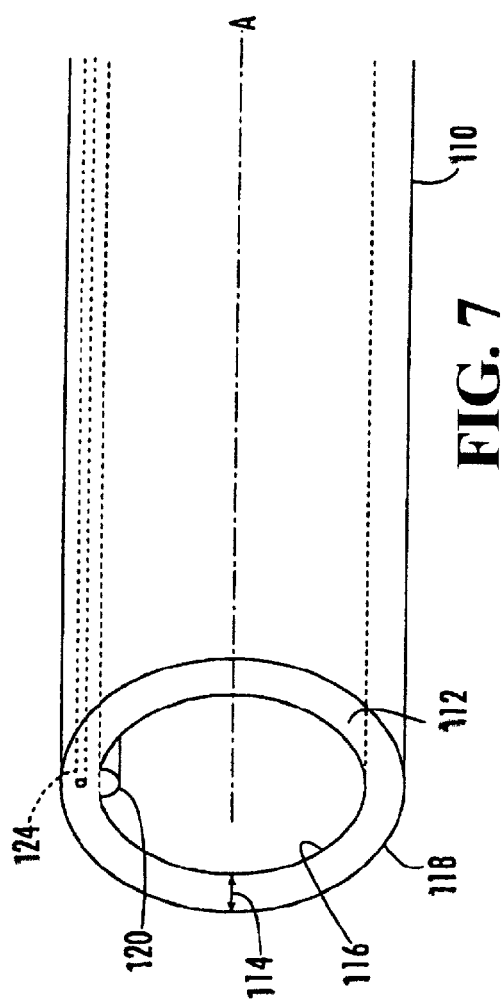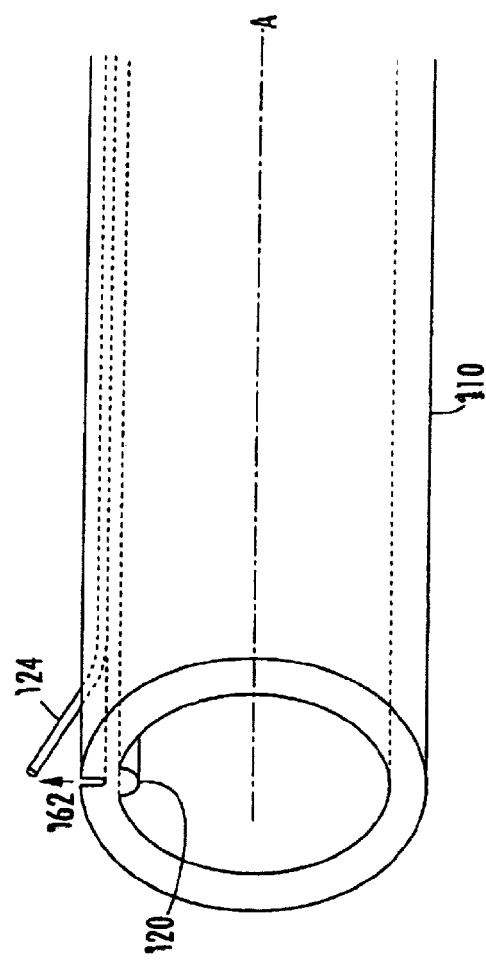

TONEABLE CONDUIT WITH HEAT TREATED TONE WIRE

CROSS REFERENCE TO RELATED APPLICATIONS

This application is a continuation-in-part of, U.S. patent application Ser. No. 10/830,754, filed Apr. 23, 2004, now U.S. Pat No. 7,820,090 which is a continuation of U.S. patent application Ser. No. 10/158,810, filed May 30, 2002 (now abandoned), which is a continuation-in-part of U.S. patent application Ser. No. 09/989,289, filed Nov. 20, 2001 (now U.S. Pat. 7,361,835). The entire contents of the three priority applications are herein incorporated by reference.

FIELD OF THE INVENTION

The present invention relates to toneable conduit and more particularly to toneable conduit that can be detected by conventional toning equipment and that includes a wire that is capable of being torn out of the conduit to allow the conduit and wire to be coupled.

BACKGROUND OF THE INVENTION

Conduit is often buried to provide an underground path for cables such as coaxial cables and fiber optic cables. In particular, conduit is typically formed of a plastic material that protects the coaxial cables and fiber optic cables from moisture and other hazards of the underground environment. The cable is typically installed in the conduit by pulling the cable through the installed conduit, although the cable can be provided in the conduit prior to installing the conduit underground.

One issue with conduit is that it can be difficult to locate underground when it is either empty or it contains only non-metallic cables, such as fiber optic cables. As a result, conduit has often been outfitted with a metallic or magnetic strip or wire that allows the conduit to be detected by metal detecting equipment on the ground surface. Although these types of detection devices are useful, they cannot always locate conduit that is buried deep underground (e.g., greater than five feet). Toning equipment is commonly used that operates by transmitting a specific signal along a metallic wire or strip associated with the conduit and detecting the signal from the ground surface using a detector tuned to the specific signal.

One conventional conduit construction that can be detected by conventional metal detection devices and the toning devices discussed above includes an exterior rib that houses the metallic ribbon or wire. For example, Japanese published application JP 5-106765 describes an embodiment that includes an exterior rib including a conductive wire. Although these types of constructions have found use, it is difficult to couple this conduit with another conduit because the exterior rib prevents the connector coupling from fitting flush with the exterior surface of the conduit. As a result, moisture can enter the conduit at the connection and can cause damage to the cable installed therein. In addition, the exterior rib can cause problems during installation in that the exterior rib and associated wire can be ripped off of the conduit if the conduit is being installed by directional boring or plowing methods.

Another conduit construction that is designed to be detected by metal detection devices includes a metallic ribbon or wire that is provided at intermittent lengths. For example, U.S. Pat. No. 6,092,558 describes such an embodiment wherein discrete lengths of a magnetic strip are spaced apart longitudinally along the conduit. U.S. Pat. No. 5,045,368 also describes a similar construction having markers at intervals along the length of the conduit. Although this type of conduit can be detected by the metal detection devices discussed above, it cannot be detected by conventional toning equipment because a signal cannot be transmitted along the conduit.

Alternatively, some conduit constructions use continuous lengths of strip or ribbon formed of metal or a magnetic material to allow the conduit to be detected by metal detecting equipment. For example, U.S. Pat. Nos. 5,051,034 and RE 34,701 describe this type of construction and use a ribbon of magnetic material to allow the conduit to be detected at three to five feet underground. U.S. Pat. Nos. 5,006,086; 5,017,873; and 5,114,517 use a magnetic ribbon that is spirally wound around the exterior surface of the conduit. Although the strip or ribbon in these constructions can be detected by conventional metal detecting equipment, it does not have a suitable construction for transmitting a toning signal for extended distances and at the depths desired in the art.

As demonstrated above, there is a need in the art to provide a conduit that can be detected by toning equipment for extended distances and at the depths desired in the art. In addition, there is a need in the art to provide conduit that can be coupled to provide extended lengths of underground conduit that can be detected by toning equipment.

Applicants' prior U.S. Pat. Nos. 7,279,643 and 7,361,835 and U.S. published applications 2003/0094298 and 2004/0262023 have disclosed a conduit design which addressed one or more of the above noted needs in the prior art. Applicants' U.S. Pat. Nos. 7,279,643 and 7,361,835 and U.S. published applications 2003/0094298 and 2004/0262023 are incorporated herein by reference.

FIG. 1 is a view of a toneable conduit 10 of Applicants' U.S. Pat. 7,361,835. The toneable conduit 10 is formed of an elongate polymeric tube that includes a sidewall 12 having a predetermined thickness 14 and further includes an interior surface 16 and an exterior surface 18. The exterior surface 18 is preferably smooth and circular in cross section so that the conduit 10 can be effectively coupled.

The conduit 10 includes a stabilizing rib 20 that extends longitudinally along the interior surface 16 of the conduit 10. The stabilizing rib 20 maintains the wall thickness 14 of the conduit 10, when a toning signal wire 24 that extends longitudinally along the length of the conduit 10, is torn out. The wire 24 runs continuously along the length of the conduit 10 and is embedded within the sidewall 12 of the conduit 10. In particular, the wire 24 is provided completely within the sidewall 12, and extends parallel to a central longitudinal axis A of the elongate polymeric tube of the conduit 10.

The wire 24 is preferably a strong, copper-clad steel wire and can transmit a toning signal along the length of the conduit 10 to allow the conduit 10, if placed underground, to be detected from the surface by toning equipment. The wire 24 is coated with a layer of a non-stick coating composition. The coating composition layer is formed of a material that prevents the wire 24 from adhering to the polymer melt used to form the elongate polymeric tube of the conduit 10.

SUMMARY OF THE INVENTION

Applicants' invention in the background art of FIG. 1 solved several problems of the prior art. For example, the wire 24 could be pulled though the sidewall 12 to permit easy coupling with another conduit or fitting. Further, the non-stick coating described in conjunction with the wire 24 of FIG. 1 allows the wire 24 to be pulled through the sidewall 12 of the conduit 10 without having portions 25 (FIG. 2) of the sidewall 12 adhered to the wire 24. In other words, the non-stick coating of the background art prevents the situation depicted in FIG. 2, wherein the conduit's sidewall 12 would be damaged as the toning signal wire 24 is pulled through it, such that leaks would be more likely to occur.

The Applicant has appreciated one or more drawbacks associated with the conduits of the prior art and Applicants' own background art.

The nonstick coating of the background art permits the wire 24 to be cleanly pulled thorough the sidewall 12 of the conduit 10. However, the channel holding the wire 24 in the sidewall 12 of the conduit 10 does not permit the wire 24 to slide longitudinally within the sidewall. Rather, the wire 24 is essentially embedded within the sidewall 12 during the extrusion process. Moreover, tension placed on the polymeric tube of the conduit 10 which causes elastic deformation in the vicinity of the channel holding the wire 24, causes the channel to clamp down on and hold the wire 24 very tightly, in the same fashion as the common toy known as "Chinese handcuffs." This characteristic of the conduit 10 can lead to a drawback under certain circumstances.

For example, a potential drawback could occur in the storage of the toneable conduit 10. Toneable conduit 10 is typically stored and transported in a coil on a large spool, e.g. a three thousand foot length of conduit 10 on a single spool. Care must be taken when winding the toneable conduit 10 onto the spool, where the toneable conduit 10 has the designs of the background art. These drawbacks will be discussed in combination with FIGS. 3-5, below.

During coiling, the wire 24 must be located at either a three o'clock position or at a nine o'clock position, so that the wire 24 is not subjected to excessive compression or tension forces. As illustrated in FIG. 3, the conduit material forming the sidewall 12 is rather elastic, and portions 27 of the sidewall 12 above the three o'clock-nine o'clock axis B can deform to a slightly thinner state under the tension forces imparted while bending the conduit 10 in the direction C during coiling. Likewise, portions 29 of the sidewall 12 below the three o'clock-nine o'clock axis B can deform to a slightly thicker state under the compression forces imparted while bending the conduit 10 in the direction C during coiling.

The wire 24 must remain basically along the three o'clock-nine o'clock axis because the wire 24 (e.g., a copper-clad steel wire) cannot deform to the degree that the polymeric material of the sidewall 12 can. Materials (e.g., portions of the sidewall 12 and the wire 24) along the three o'clock-nine o'clock axis B do not experience either compression or tension, as the conduit 10 is bent in the direction C during coiling.

The wire 24 can be damaged and the toneable conduit 10 rendered inoperable if the conduit 10 is coiled while the wire 24 is off of the three o'clock-nine o'clock axis B. For example, as illustrated in FIG. 4, if the toneable conduit 10 were bent in the direction C during coiling while the wire 24 is disposed near the twelve o'clock position, the wire 24 would be placed under excessive tension. The wire 24 could break several times and be pulled apart, as indicated at locations 31 and 32.

Further, the tension could cause the wire 24 to tear through the rib 20 and enter the interior of the conduit 10, as indicated at location 33. This could be damaging to the communication cables within the conduit 10 from a physical standpoint and could also influence performance characteristics of an electrical communication cable, such as the crosstalk performance of a twisted pair cable. Moreover, the toneable feature of the conduit 10 is inoperable, if continuity through the wire 24 is lost.

As illustrated in FIG. 5, if the toneable conduit 10 were bent in the direction C during coiling while the wire 24 is disposed near the six o'clock position, the wire 24 would be placed under excessive compression. The wire 24 could break several times and cross over itself, as indicated at locations 34 and 35. At a crossover, the wire 24 could also protrude through the sidewall 12 and into the interior of the conduit 10, as at location 34. At a crossover, the wire 24 could also protrude through the sidewall 12 and to the exterior of the conduit 10, as at location 35. An interior protrusion, as at location 34, could be damaging to the communication cables within the conduit 10 from a physical standpoint and could also influence performance characteristics of an electrical communication cable within the conduit 10. A protrusion to the exterior of the conduit 10 can allow damaging moisture to enter the conduit 10. Moreover, the toneable feature of the conduit 10 is inoperable, if continuity through the wire 24 is lost.

It is also possible to break the wire 24 of the conduit 10 when pulling the conduit 10 during installation. For example, often times a hole is laterally bored through the ground (e.g., under a street) using a boring tool. When the hole is completed by the tool, the end of a conduit 10 is attached to the tool and the tool is withdrawn back through the bored hole, hence pulling the conduit 10 along through the hole.

During the pulling, the conduit 10 may be exposed to high tension forces due to friction within the bored hole. The polymer material of the sidewall 12 of the conduit 10 can elongate to some degree under the tension. However, the wire 24 cannot elongate to the same degree as the sidewall 12. Moreover, the elongation of the sidewall 12 causes the wire 24 to be tightly gripped within its channel in the sidewall 12, in the same manner as "Chinese handcuffs." Hence, the wire 24 will break, and the toneable feature of the conduit 10 will be inoperable. In one study, an elongation of 3 to 4% in the sidewall 12 caused the wire 24 to break, while the polymer material of the sidewall 12 could withstand elongations of about 4% to about 8% without structural damage.

It is also possible that the wire 24 could be damaged, or at least more susceptible to damage, dependent upon the temperature of the conduit 10 during coiling and installation. The wire 24 and the polymer material of the conduit 10 have different coefficients for expansion and contraction based upon temperature. The temperature of the conduit 10 can affect the contraction gripping force applied to the wire 24 during elongation or compression of the polymeric material of the sidewall 12 during coiling and installation.

It is an object of the present invention to address one or more of the drawbacks of the prior art toneable conduits discussed above and/or Applicants' appreciated needs in the art of toneable conduits.

These and other objects are accomplished by a toneable conduit including an elongate polymeric tube having a sidewall with an interior surface and an exterior surface. The interior surface defines a main channel for holding communication or power cables. A sub-channel extends longitudinally between the exterior and interior surfaces of the tube. An electrically continuous, toning signal wire is located within the sub-channel. The toning signal wire is formed of an annealed metal or metals and is capable of elongation to a certain extent without breakage, wherein the certain extent approximates or exceeds the extent of elongation of the tube at the point of failure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 7 is a perspective view of the toneable conduit of FIG. 6

FIG. 12 is a perspective view of the toneable conduit of FIGS. 6 and 7 wherein the wire has been torn through the exterior surface of the conduit.

DETAILED DESCRIPTION OF THE INVENTION

Figure 1:
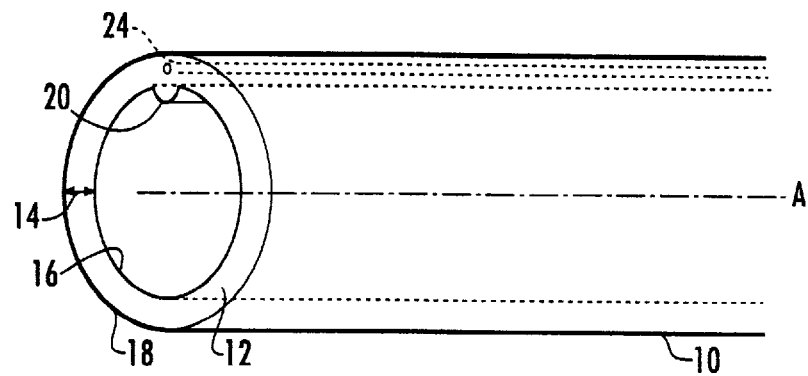
FIG. 1 is a perspective view of an end of a toneable conduit with a toning signal wire in a sidewall, in accordance with the background art.
Figure 2:
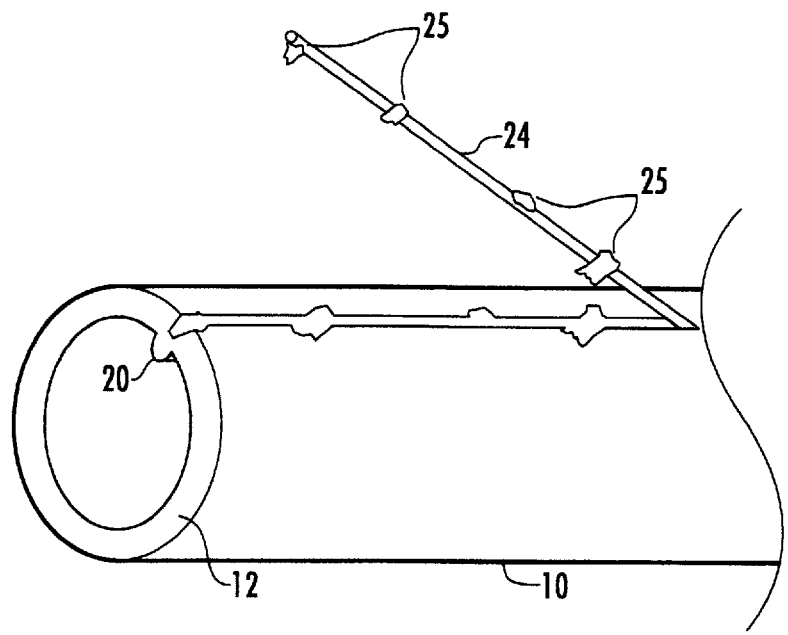
FIG. 2 is a perspective view of the conduit of FIG. 1 with a toning signal wire torn from the sidewall of the conduit, demonstrating a downside of not providing a non-stick coating on the wire.
Figure 3:
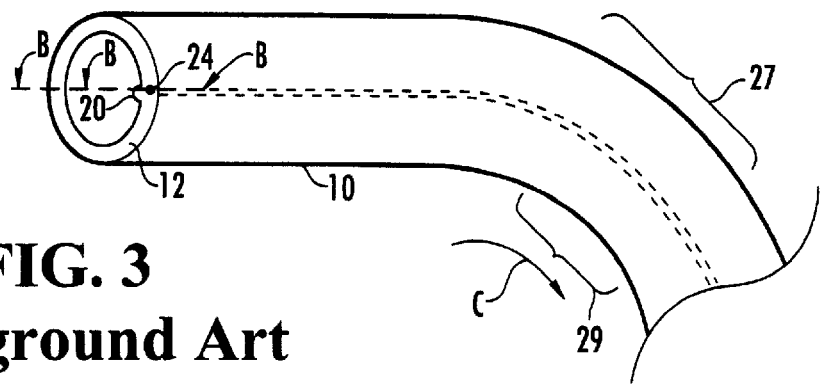
FIG. 3 is a perspective view of a section of the toneable conduit of FIG. 1 undergoing a bend with the toning signal wire at a three o'clock position.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
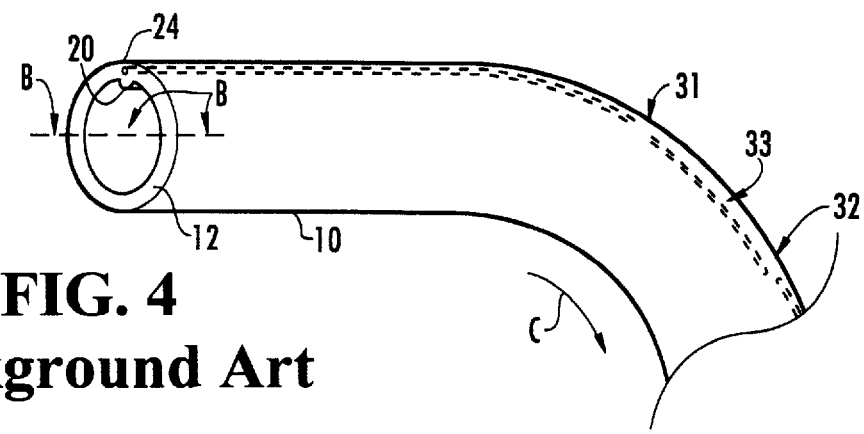
FIG. 4 is a perspective view of a section of the toneable conduit of FIG. 1 undergoing a bend with the toning signal wire at a twelve o'clock position.
Figure 5:
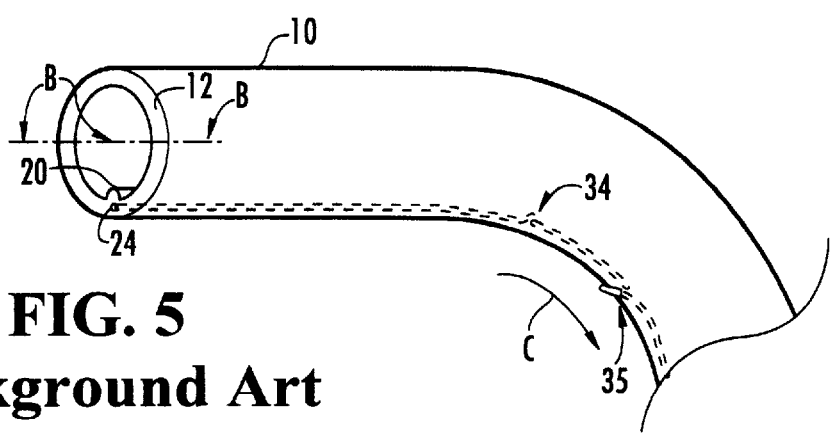
FIG. 5 is a perspective view of a section of the toneable conduit of FIG. 1 undergoing a bend with the toning signal wire at a six o'clock position.
Figure 6:
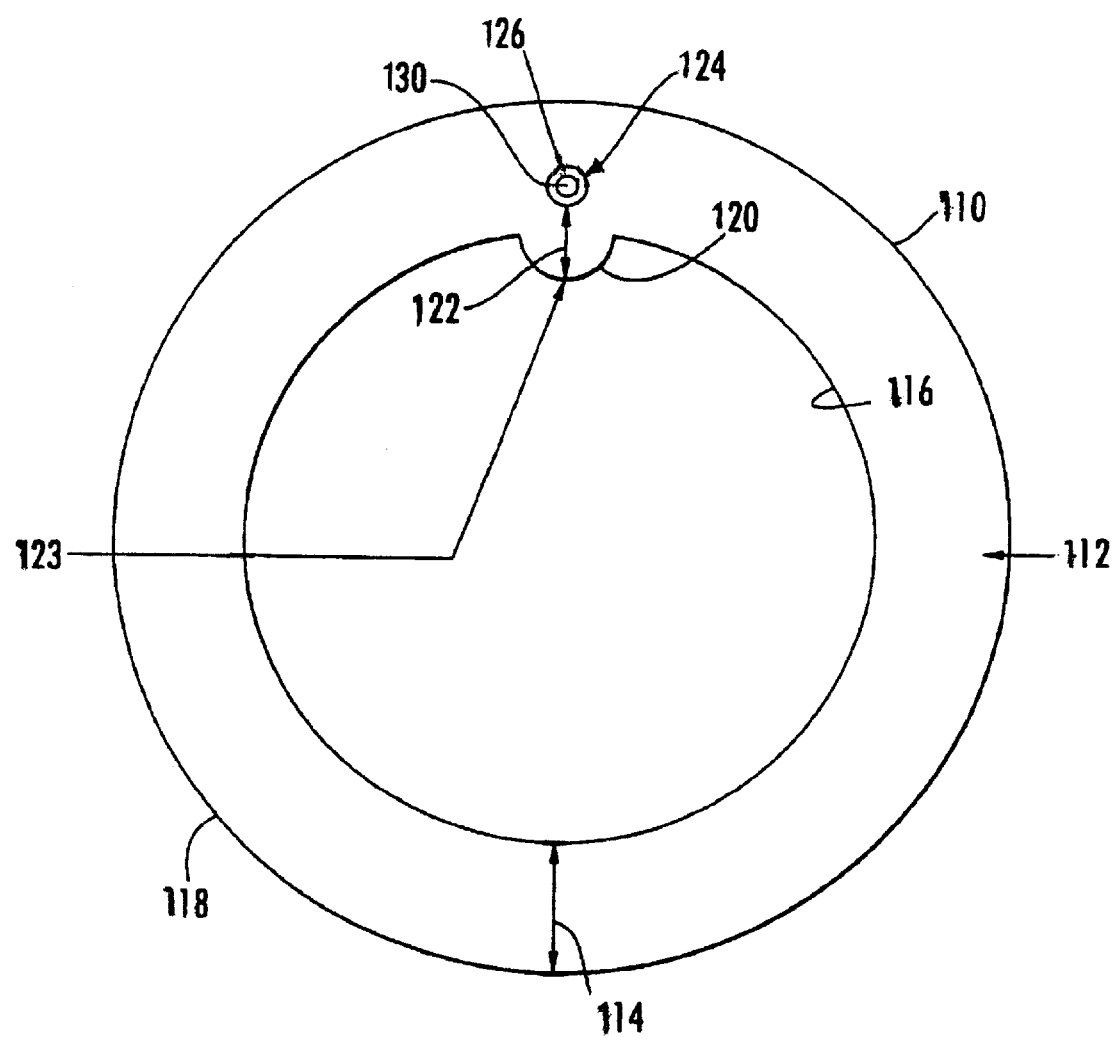
FIG. 6 is an end view of a toneable conduit with a toning signal wire in a sidewall, in accordance with the present invention.

FIGS. 6-7 illustrate a toneable conduit with a toning signal wire in a sidewall, in accordance with a first embodiment of the present invention. The toneable conduit may be formed in accordance with the embodiments of Applicants' prior U.S. Pat. Nos. 7,279,643 and 7,361,835 and U.S. published applications 2003/0094298 and 2004/0262023, except that the toning signal wire of the previous embodiments has been replaced with a newly designed toning signal wire, which permits the toning signal wire to elongate to a same or greater extent as that of the sidewall of the toneable conduit. Hence, the failures or breakages of the toning signal wire, as discussed in paragraphs 015-024 above and depicted in FIGS. 4 and 5, may be reduced in occurrence, or avoided completely.

More specifically, FIGS. 6 and 7 illustrate a first embodiment of a toneable conduit, according to the present invention. As shown in these figures, the conduit is formed of an elongate polymeric tube 110 that includes a wall 112 having a predetermined thickness 114 and further includes an interior surface 116 and an exterior surface 118. The exterior surface 118 is preferably smooth so that the conduit can be effectively coupled as discussed in more detail below.

The conduit can be formed of any suitable polymeric (i.e. plastic) material and suitable polymeric materials for conduit are known in the art such as polyethylene or polyvinyl chloride. Preferably, the elongate polymeric tube 110 is formed of high density polyethylene (HDPE). The polymeric material can also be blended with certain additives, e.g., for UV protection. The wall 112 of the elongate polymeric tube 110 typically has a predetermined thickness 114 of from about 0.05 inches to about 0.75 inches. Moreover, the elongate polymer tube 110 typically has a nominal inside diameter of from about 0.5 inches to about 6.5 inches. In one embodiment, the exterior surface 118 of the toneable conduit 110 has a diameter of about 1.66 inches, and the interior surface 116 of the toneable conduit 110 has a diameter of about 1.40 inches, which forms a main channel to house cables C, C' (see FIG. 8).

The toneable conduit preferably includes a stabilizing rib 120 that extends longitudinally along the interior surface 116 of the elongate polymeric tube 110. As shown in FIGS. 6 and 7, the stabilizing rib 120 is integral with the elongate polymeric tube 110 and formed of the same material as the elongate polymeric tube. The stabilizing rib 120 maintains the wall thickness 114 of the conduit when the wire is torn out of the conduit, as discussed in more detail below, such that it can withstand the forces typically associated with installation, use and transport of the conduit.

Typically, the stabilizing rib 120 extends from the interior surface 116 of the elongate polymeric tube 110 such that the distance 122 from the wire to the interior edge 123 of the stabilizing rib is at least equal to the wall thickness 114. The stabilizing rib 120 is also located radially inward from the wire used in the invention. The stabilizing rib 120 illustrated in FIGS. 6 and 7 has a generally semi-cylindrical shape (i.e. an arcuate cross-section) but can have a rectangular or trapezoidal shape, for example, so long as it provides the desired amount of strength and stability to the conduit wall 112. In addition to the stabilizing rib 120, the conduit can include additional ribs (see FIGS. 8 and 9) extending longitudinally along the interior surface 116 of the elongate polymeric tube 110 and integral with the elongate polymeric tube to facilitate the installation of cable in the conduit by decreasing the surface area in contact between the interior surface of the elongate polymeric tube and the cable.

As shown in FIGS. 6 and 7, the toneable conduit includes a toning signal wire 124 that extends longitudinally along the length of the elongate polymeric tube 110 and is coincident with a sub-channel the extends longitudinally within the wall 112 of the elongate polymeric tube 110. The wire 124 runs continuously along the length of the elongate polymeric tube 110 and is embedded within the wall 112 of the elongate polymeric tube. In particular, the wire 124 is typically provided completely within the wall 112 of the elongate polymeric tube 110. Preferably, the wire 124 extends parallel to a central longitudinal axis A of the elongate polymeric tube 110.

The wire 124 possesses sufficient tensile strength and elongation to allow the wire to be torn out through the exterior surface 118 of the elongate polymeric tube 110 (e.g., by using a pair of pliers). The wire 124 has a diameter of from 0.32 mm (28 gauge) to 2.59 mm (10 gauge), and more preferably is twenty gauge or larger. In a preferred embodiment, the wire 124 has a diameter of 18 gauge. The wire 124 may be a copper-clad steel wire, copper-clad aluminum wire, copper wire or tin copper (tin-clad copper) wire. In a preferred embodiment, the wire 124 is a copper-clad steel wire.

Figure 8:
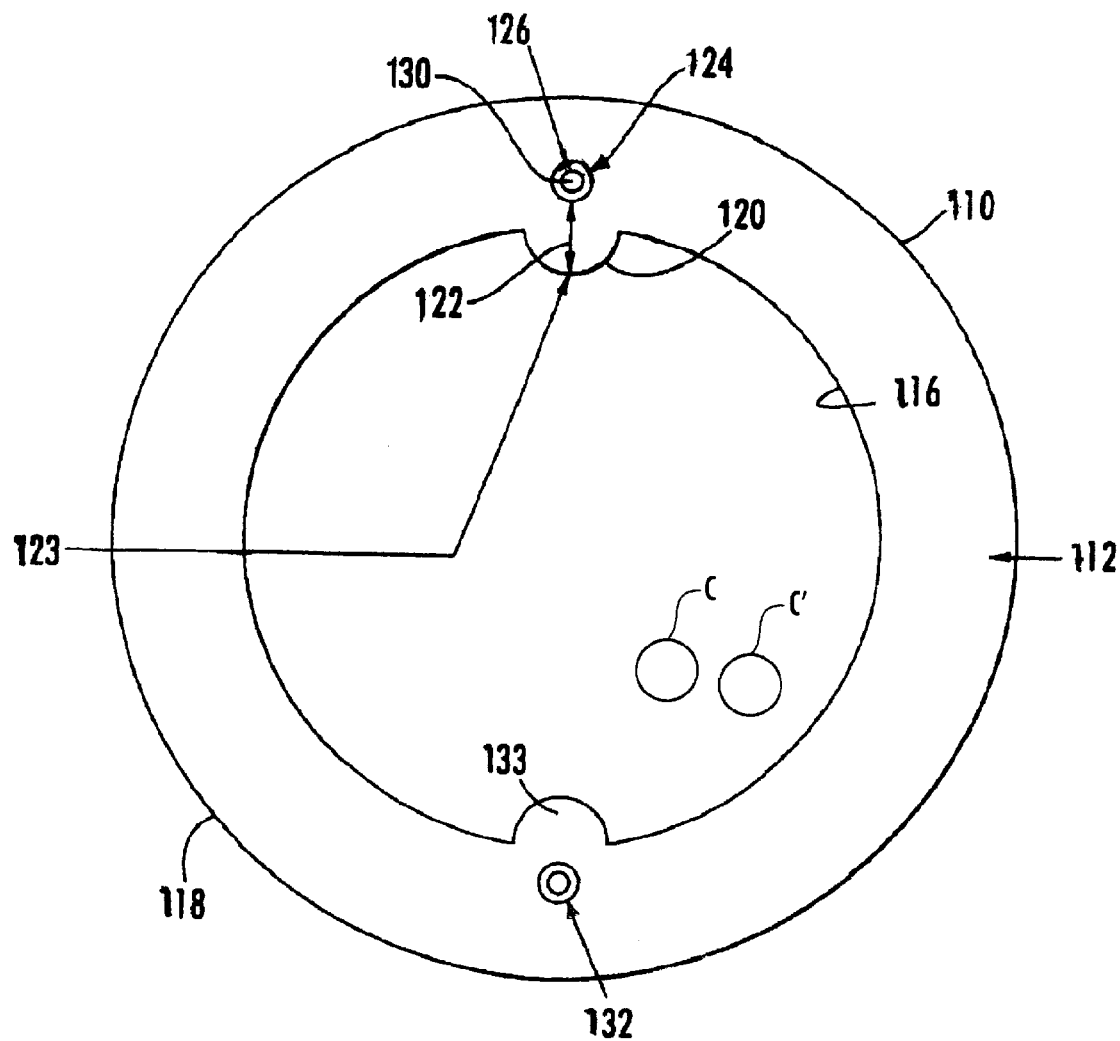
FIG. 8 is an end view of a toneable conduit according to a first alternative embodiment.
Figure 9:
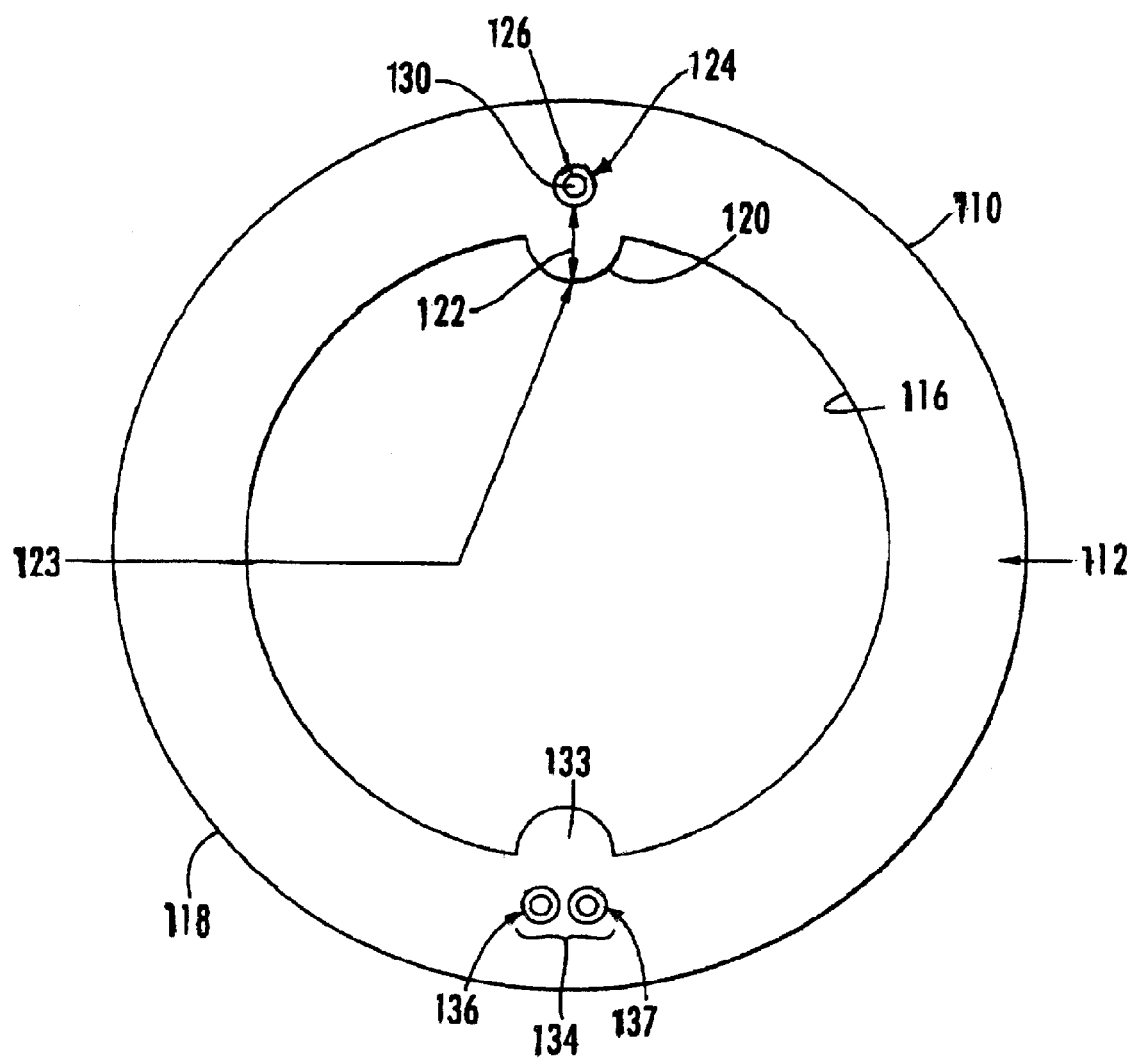
FIG. 9 is an end view of a toneable conduit according to a second alternative embodiment.

The copper-clad steel wire 124 is depicted in FIGS. 6, 8 and 9. The copper clad steel wire 124 has an outer copper surface 126, which forms about 14% of the overall wire 124 by weight, although other percentages may be practiced in accordance with the present invention. The copper clad steel wire 124 also has a steel core 130, which forms about 86% of the overall wire 124 by weight, although other percentages may be practiced in accordance with the present invention.

In accordance with one embodiment of the present invention, the wire 124 is subjected to an annealing process prior to its embedding in the sidewall 112. Annealing is a heat treating process which alters the physical properties of the wire 124, changing the strength and hardness of the wire 124. In one tested embodiment of the present invention, prior to the annealing process, the copper-clad steel wire 124 (having 21% conductivity, under the IACS (international annealed copper standard), using a steel with a carbon content of about 0.1% and being of eighteen gauge) had a tensile strength of about 190 lbs., as measured according to ASTM method B869, and had an elongation of about 1% to 3%, as measured according to ASTM methods B3 and B869.

During the annealing process, the tested wire 124 (as detailed above) was subjected to a heat of about 1,050 degrees Fahrenheit for a period of about 7 hours. The annealing process may occur in an atmosphere controlled environment using a gas such as Hydrogen, Nitrogen, Cracked natural gas or Argon. When the annealing process was competed and the tested wire 124 was cooled, and the wire 124 had assumed different physical properties. For example, the annealed wire 124 had a tensile strength of about 100 lbs., as measured according to ASTM method B869 (a reduction of about 47%), and the annealed wire 124 had an elongation of about 30%, as measured according to ASTM methods B3 and B869 (an increase of about 900%).

Of course, the temperature and time values of the annealing process may be varied from the tested parameters above to obtain a wire 124 with a desired elongation and a desired tensile strength. For example, the temperature could be varied from about 800 degrees Fahrenheit to about 1,600 degrees Fahrenheit; the time could be varied from about 2 hours to about 15 hours and the carbon content of the steel could be varied from about 0.1% to about 0.2% in order to obtain a toning wire 124 having a desirable tensile strength and elongation. At the present time, it is believed that a temperature of about 1,050 degrees Fahrenheit for a time of about 3.5 hours using a 21% conductivity (under IACS) copper clad steel wire, with steel having about a 0.1% carbon content, would produce a preferred toning wire 124 with a tensile strength of about 125 lbs and elongation of about 15%. Although the test sample described above used wire with 21% conductivity, using the IACS, other wires could be employed in accordance with the present invention, such as wires have IACS conductivities ranging from about 18% to about 40%, such as 25%, 30% and 32%.

The sidewall 112 of the conduit "fails" at an elongation of about 4% to about 8%, where failure is defined as a sidewall portion of the elongate polymeric tube 110 breaking or permanently thinning and necking down to a smaller diameter. Therefore, it is expected that the elongate polymeric tube 110 of the conduit will fail before the wire 124 breaks during the installation of the conduit, such as when the conduit is being pulled using force in a boring operation. This is quite an advantage over the background art since previously, the conduit might be elongated a small percentage (e.g., 3%) during the boring installation process which resulted in the wire 24 being broken. The elongate polymeric tube 110 would not fail, rather it would resume its natural state after the elongation force was relieved, hence the conduit would appear normal, yet the toning signal wire 124 would be broken and inoperable.

As mentioned above, the wire 124 runs continuously along the length of the elongate polymeric tube 110 and thus it can transmit a toning signal along the length of the conduit to allow the underground conduit to be detected from the surface by toning equipment. Moreover, because of the "skin effect" associated with signal transmission as understood by those skilled in the art, the signal is transmitted along the outer copper surface 126 of wire 124 and thus takes advantage of the conductivity of the copper portion present in the preferred wire 124 used with the invention. As a result, the wire 124 of the conduit can transmit signals over long distances as desired in the art (e.g. at least 5 miles). It has been discovered that a larger diameter wire 124 (e.g. 18 gauge) transmits a toning signal over longer distances than a smaller diameter wire. Moreover, a larger diameter wire 124 is stronger than a smaller diameter wire and thus can more effectively be torn out of the conduit when it is coupled with another conduit.

In a preferred embodiment, the wire 124 is coated with a layer of a coating composition. The coating composition layer typically has a thickness of from about 1 to about 15 mils, and is more preferably about 8 mils. The coating composition layer is formed of a material that prevents the wire 124 from adhering to the polymer melt used to form the elongate polymeric tube 110. Accordingly, the coating composition layer 130 is typically formed of a polymeric material that has a melting temperature above the temperature of the polymeric melt so that is does not melt during the formation of the elongate polymeric tube 110. Preferably, the coating composition layer is formed of fluoropolymers (e.g. polytetrafluoroethylene (PTFE), fluorinated ethylene-propylene (FEP), ethylenetrifluoroethylene (ETFE), and ethylenechlorotrifluoroethylene (ECTFE), polyvinyl fluoride (PVF) and polyvinylidene fluoride (PVDF)); polyamides (e.g. nylon); polyesters (e.g. polyethylene terephthalate (PET)); polycarbonates; polypropylene; polyurethanes; polyacetals; polyacrylics; epoxies; silicone grease; silicone polymers; PVC and mixtures thereof. The high melting temperature polymeric materials used in the coating preferably has a melting temperature of at least about 500 degrees Fahrenheit. In a preferred embodiment, the coating composition layer is formed of silicone grease, polytetrafluoroethylene (e.g., TEFLON®), or a combination of both substances. Advantageously, because the wire 124 is coated, it also protects the wire 124 from the underground environment when it is torn out of the conduit and electrically connected to the wire from an adjacent conduit as discussed in more detail below. In particular, the coating composition layer preferably provides corrosion resistance to the wire 124. In one embodiment, the wire 124, once coated, may assume a larger diameter, such as about 0.058 inches in diameter.

Although not illustrated in FIGS. 6 and 7, the main channel of the conduit of the invention can include one or more communication cables or power cables C, C' (See FIG. 8), such as coaxial cables, fiber optic cables, twisted pair cables, electrical cables, support or messenger cables, and the like. The advantages of the invention are particularly evident when toning equipment is used to locate empty conduit (not including any cable) or conduit containing non-metallic cable, such as fiber optic cable.

FIGS. 8 and 9 illustrate toneable conduits according to alternative embodiments of the invention. As shown in FIGS. 8 and 9, the toneable conduit can further include a conductor such as a second continuous wire 132 (FIG. 8) or a twisted pair of continuous wires 134 (FIG. 9) that extends longitudinally along the length of the elongate polymeric tube 110. The conductor is coincident with a channel that extends longitudinally within the wall 112 of the elongate polymeric tube 110 and that is typically different than the channel that is coincident with the wire 124. The conductor runs continuously along the length of the elongate polymeric tube 110 and is embedded within the wall 112 of the elongate polymeric tube. In particular, the conductor is typically provided completely within the wall 112 of the elongate polymeric tube 110. Preferably, the conductor extends parallel to a central longitudinal axis A of the elongate polymeric tube 110. As shown in FIGS. 8 and 9, the toneable conduit can also include a stabilizing rib 133 that is located radially inward from the conductor used in the invention, in the same manner as the stabilizing rib 120.

Like the wire 124, the wire 132 illustrated in FIG. 8 possesses sufficient tensile strength and elongation to allow the wire to be torn out through the exterior surface 118 of the elongate polymeric tube 110. The wire 132 may be formed identically to the wire 124, having the same properties with regard to tensile strength and elongation. In other words, in a preferred embodiment, the wire 132 is an annealed, copper-clad steel wire, and has a coating composition, like the coating composition described above with respect to the wire 124.

Each of the wires 136 and 137 in the twisted pair of continuous wires 134 illustrated in FIG. 9 preferably has sufficient tensile strength and elongation to allow the twisted pair of wires to be torn out through the exterior surface 118 of the elongate polymeric tube 110. For example, the continuous wires 136 and 137 used in the twisted pair of continuous wires 134 can be formed of the wire described above with respect to the wire 124. In addition, the wires 136 and 137 preferably include a coating composition like the coating composition described above with respect to the wire 124.

As mentioned above, the wire 132 and the twisted pair of wires 134 run continuously along the length of the elongate polymeric tube 110. Thus, the wire 132 and the twisted pair of wires 134 can provide a return path for signals that can be used to monitor the status of the cable. For example, the wire 132 and the twisted pair of wires 134 can be used with time-domain reflectometer (TDR) devices to determine if there are damage points along the length of the conduit. As is well understood to those skilled in the art, TDR devices are meters with an oscilloscope-type display that send out a pulse along a line of cable and that measure any inconsistencies in the cable. The pulse is reflected back at a break point or damaged point (e.g., crimped point) in the wire, and the time delay in receiving the reflected signal is used to accurately determine where a break or other problem is in the conduit. The TDR devices greatly reduce the time that would otherwise be needed to physically locate problems in the conduit.

Figure 10:
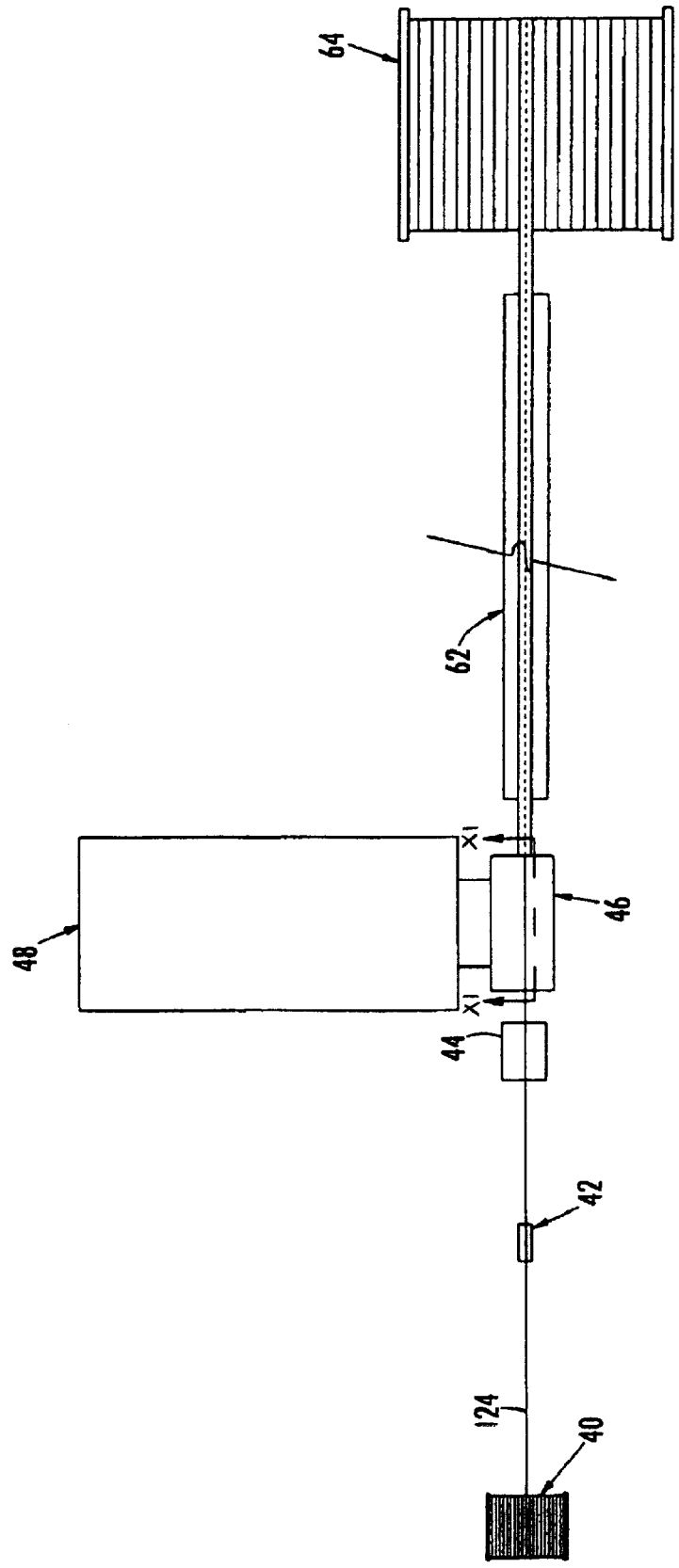
FIG. 10 schematically illustrates a method of making toneable conduit in accordance with an embodiment of the invention.

FIG. 10 illustrates the preferred method embodiment for producing the toneable conduit of the invention. As shown in FIG. 10, the annealed wire 124 is taken from a supply reel 40 and is fed through a wire guide 42. The wire 124 then passes through a lubrication apparatus 44 that lubricates the wire for further downstream processing. The lubricated wire 124 then advances into a crosshead 46, which communicates with an extruder apparatus 48 via a flow channel (not shown). Although not illustrated in FIG. 10, a second wire 132 or a twisted pair of wires 134 can also be taken from a supply reel (not shown), fed through a wire guide, lubricated and advanced into the crosshead 46 in the manner described herein with respect to the wire 124 to produce the toneable conduits illustrated in FIGS. 8 and 9.

The polymeric materials and any additives such as colorants that are used to form the elongate polymeric tube 110 (and stabilizing rib 120) are fed to the extruder apparatus 48, e.g., through a hopper (not shown). In a preferred embodiment of the invention, the polymeric materials include HDPE, as discussed above. The extruder apparatus 48 operates at an elevated temperature above the melting temperature of the polymeric materials used to form the elongate polymeric tube 110 to provide a polymer melt. For example, in a preferred embodiment of the invention wherein the conduit is formed of HDPE, the extruder apparatus 48 is operated at a temperature of from about 300 degrees Fahrenheit to about 500 degrees Fahrenheit.

In FIG. 10, the wire 124 stored on the spool 40 has already been through an annealing process. It could be possible to anneal the wire 124 in an online process. For example, the wire 124 could be subjected to heating via an induction coil or heated plasma, then cooled in a water bath or air stream prior to entering the crosshead 46.

Figure 11:
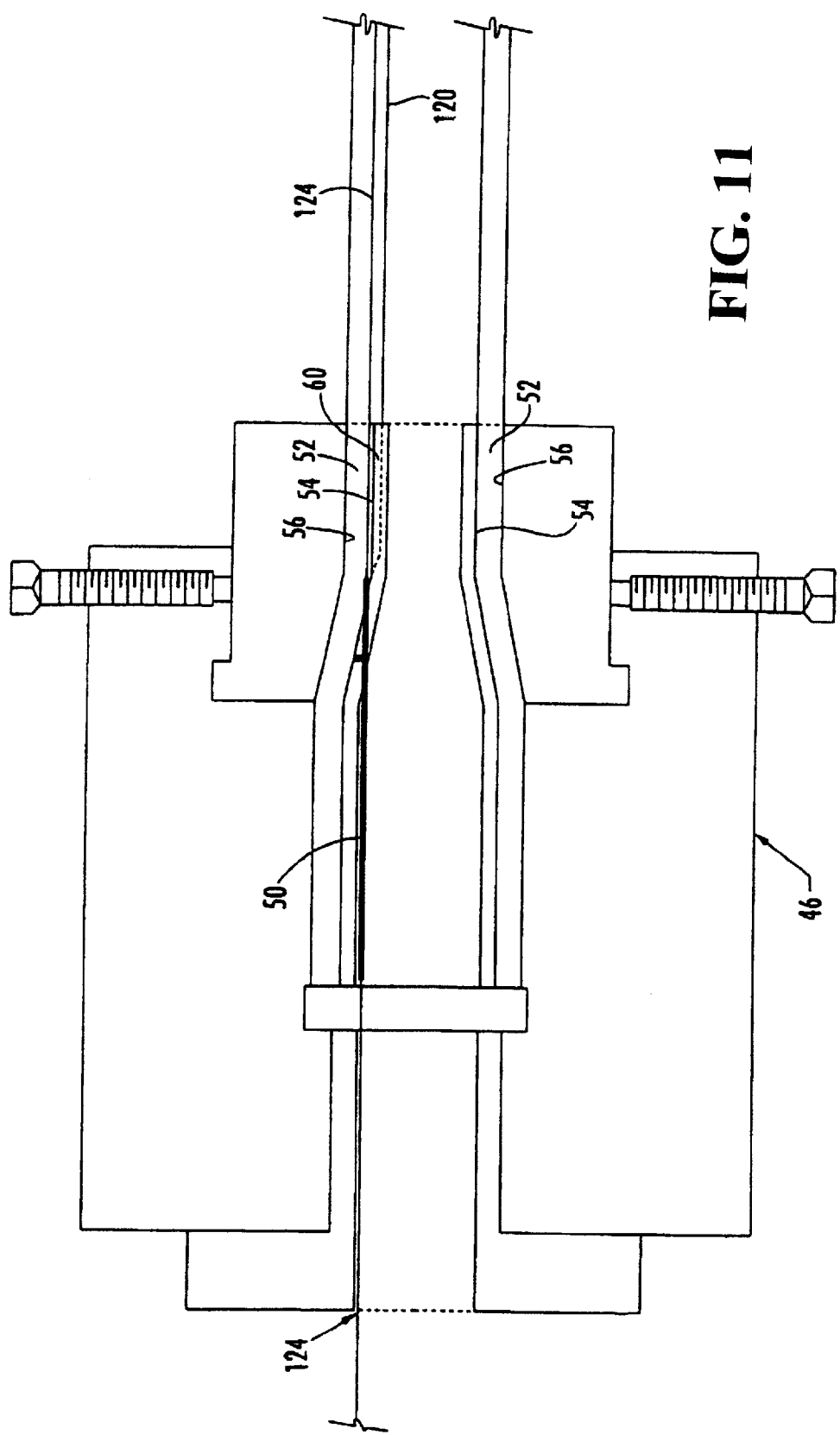
FIG. 11 is a cross sectional view taken along line XI-XI in FIG. 10.

FIG. 11 illustrates the formation of the conduit of the invention in more detail. A wire guide tube 50 delivers the wire 124 to an annular gap 52 between a tip 54 and a die 56 of the crosshead 46, while the extruder apparatus 48 delivers the polymer melt to the annular gap through a flow channel (not shown). The tip 54 and the die 56 form the annular gap 52 and shape the polymer melt into a tubular configuration to form the elongate polymeric tube 10. In particular, the tip 54 provides the shape of the interior surface 116 of the elongate polymeric tube 110, while the die 56 provides the shape of the exterior surface 118 of the elongate polymeric tube. A groove 60 provided in the tip 54 forms the stabilizing rib 120 in the conduit. Although not shown, additional grooves can be provided in the tip 54 to provide additional ribs along the interior surface 116 of the elongate polymeric tube 110 to facilitate the installation of cable in the conduit. The polymer melt forms around the wire 124 and the wire 124 becomes embedded in the wall 112 of the elongate polymeric tube 110. The coating composition layer on the wire 124 and the lubricant applied to the wire advantageously prevent the wire 124 from sticking to the polymer melt and facilitate the formation of the conduit of the invention. In a preferred embodiment, the lubricant applied to the wire 124 is sufficient to prevent the wire 124 from sticking to the polymer melt, such that the coating layer is not longer required.

Referring again to FIG. 10, the conduit leaves the crosshead 46 and advances to a cooling trough 62 that utilizes water to cool the conduit to allow it to harden. The conduit is then advanced to a take-up reel 64. The conduit can be stored or shipped on the take-up reel 64 and can readily be installed by unwinding the conduit from the take-up reel.

As mentioned above, the conduit of the invention can be readily coupled with other conduit. In particular, as shown in FIG. 12, the wire 124 can be torn out through the exterior surface 118 of the elongate polymeric tube 110 by applying a force on the wire perpendicular to the axis A in a direction 162. As discussed above, the preferred wire 124 used in accordance with the invention has sufficient tensile strength and elongation to tear through the HDPE conduit. Once the wire 124 is torn out through the conduit, the conduit can be coupled with an adjacent conduit.

Figure 13:
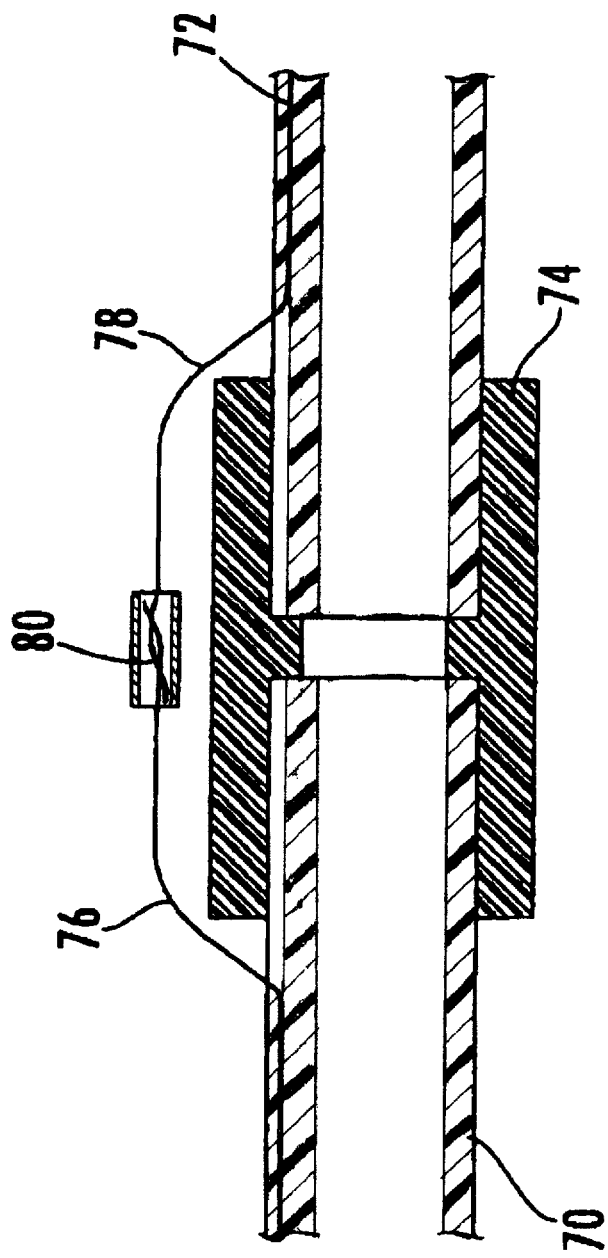
FIG. 13 is a cross sectional view of two adjacent coupled sections of conduit, in accordance with the present invention.

As shown in FIG. 13, a first conduit 70 is coupled with a second conduit 72. A conduit connector 74 is fitted/glued onto the first conduit 70 and the second conduit 72 to provide a connection between adjacent segments of conduit. A wire 76 torn out of the first conduit 70 and a wire 78 torn out of the second conduit 72 are electrically connected or coupled together through the use of a suitable device, such as the electrical connector 80. If the first conduit 70 and the second conduit 72 include a wire 132 or a twisted pair of wires 134, as illustrated in FIGS. 8 and 9, the wire 132 or twisted pair of wires 134 can also be torn through the conduits and electrically connected in the manner described with respect to the wires 76 and 78. In accordance with the invention, because the conduit of the invention has a smooth exterior surface, the conduit connector 74 fits flush to the exterior surfaces of the first conduit 70 and second conduit 72. As is understood in the art, the first conduit 70, second conduit 72, conduit connector 74, wire 76, wire 78 and electrical connector 80 can optionally be wrapped by a shrink wrap film that is heated to allow it to shrink around the conduit to prevent the ingress of moisture into the conduit along the conduit connector 74.

The conduit of the invention can advantageously be detected with conventional toning equipment used in the art. In particular, when the conduit of the invention is buried underground, even if it is empty or contains a non-metallic cable, it can be detected by toning equipment by transmitting a signal along the wire 124 and detecting the signal from the ground surface. As a result, the conduit of the invention can be detected at levels as deep as 10 feet underground, or even at greater depths through the use of toning equipment. Moreover, the conduit of the invention can also be detected :by metal detecting equipment at the lower underground depths (e.g. 3-5 feet).

In addition to being detectable by toning equipment, i.e., toneable, because the conduit of the invention can be readily coupled as discussed above, the conduit of the invention can be detected underground over extended lengths, e.g., 5 to 10 miles, as desired in the art. Furthermore, the conduit can include a wire 132 or a twisted pair of wires 134 and can be used to provide a return path for signals to determine if damage points exist along the conduit.

The annealed wire or wires 124, 132 and/or 134 allow significant elongation of the wires without breakage or damage. Elongation of the conduit's wall 112 during spooling and/or installation should not break or damage the toning wires, since the elongation limits of the toning wires exceeds the elongation of the conduit's walls, in a preferred embodiment.

Although the present invention has been described and illustrated with at least one rib 120 on the inner surface 116, several of the advantages of the present invention could be achieved without a rib 120. The annealed wire 124 could still be employed to permit conduit elongation without damage to the wire 124, and the wire 124 could still be pulled through the outside surface 118 of the wall 112 to permit coupling of the conduit end to another conduit end.

In the background art an elongation of the sidewall 12 of perhaps 3% resulted in the breaking of the wire 24. In the structures of the present invention, the elongation of the sidewall 112 could reach its failure point (e.g., about 4% to about 8%) prior to breaking of the wire 124, since the wire is capable of elongations exceeding 10%, more preferably exceeding 20%. In a preferred embodiment, the wire 124 may be elongated up to about 30% before breakage of the wire 124.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A toneable conduit comprising:
   a polymer material forming an elongated tube;
   a main channel formed within said elongated tube for accepting at least one communication cable;
   a sub-channel formed within said elongated tube; and
   an annealed toning signal wire resident within said sub-channel, said toning signal wire being electrically conductive from a first end of said toneable conduit to a second end of said toneable conduit.

2. The toneable conduit according to claim 1, wherein said polymer material forming said elongate tube may be elongated under longitudinal tension to increase its length up to a first extent before mechanical failure of the elongate tube results and a portion of said elongate tube breaks or permanently necks down to a smaller diameter, and wherein said toning signal wire may be elongated under longitudinal tension to increase its length beyond said first extent without breakage of said toning signal wire.

3. The toneable conduit according to claim 2, wherein said first extent is about 4% to about 8%, such that when said elongate tube is elongated by longitudinal tension to increase its length by more than about 4% to about 8%, a portion of said elongate tube breaks or permanently necks down to a smaller diameter.

4. The toneable conduit according to claim 3, wherein said toning signal wire may be elongated under longitudinal tension to increase its length by more than 10% without a breakage in said toning signal wire.

5. The toneable conduit according to claim 3, wherein said toning signal wire may be elongated under longitudinal tension to increasing its length by more than 20% without a breakage in said toning signal wire.

6. The toneable conduit according to claim 1, wherein said sidewall defining said main channel includes an exterior surface and an interior surface, and wherein said sub-channel resides between said exterior surface and said interior surface.

7. The toneable conduit according to claim 1, wherein said toning signal wire is coated with a coating composition that prevents said toning signal wire from adhering to said polymer material of said elongated tube.

8. The toneable conduit according to claim 7, wherein said coating composition includes polytetrafluoroethylene.

9. The toneable conduit according to claim 7, wherein said interior surface protrudes inwardly toward a center of said elongated tube immediately below said sub-channel to form an interior surface with a rib to facilitate the installation of cables within said main channel of said toneable conduit.

10. The toneable conduit according to claim 1, wherein said polymer material is high density polyethylene.

11. A toneable conduit comprising:
    a polymer material forming an elongated tube;
    a main channel formed within said elongated tube for accepting at least one communication cable;
    a sub-channel formed within said elongated tube; and
    a copper-clad steel toning signal wire resident within said sub-channel, wherein said polymer material forming said elongate tube may be elongated under longitudinal tension to increase its length up to a first extent before mechanical failure of the elongate tube results and a portion of said elongate tube breaks or permanently necks down to a smaller diameter, and wherein said toning signal wire may be elongated under longitudinal tension to increase its length beyond said first extent without breakage of said toning signal wire.

12. The toneable conduit according to claim 11, wherein said first extent is about 4% to about 8%, such that when said elongate tube is elongated by longitudinal tension to increase its length by more than about 4% to about 8%, a portion of said elongate tube breaks or permanently necks down to a smaller diameter.

13. The toneable conduit according to claim 11, wherein said toning signal wire may be elongated under longitudinal tension to increase its length by more than 10% without a breakage in said toning signal wire.

14. The toneable conduit according to claim 11, wherein said toning signal wire may be elongated under longitudinal tension to increasing its length by more than 20% without a breakage in said toning signal wire.

15. The toneable conduit according to claim 11, wherein said sidewall defining said main channel includes an exterior surface and an interior surface, and wherein said sub-channel resides between said exterior surface and said interior surface.

16. The toneable conduit according to claim 11, wherein said toning signal wire is coated with a coating composition that prevents said toning signal wire from adhering to said polymer material of said elongated tube.

17. The toneable conduit according to claim 16, wherein said coating composition includes polytetrafluoroethylene.

18. The toneable conduit according to claim 16, wherein said interior surface protrudes inwardly toward a center of said elongated tube immediately below said sub-channel to form an interior surface with a rib to facilitate the installation of cables within said main channel of said toneable conduit.

19. The toneable conduit according to claim 11, wherein said polymer material is high density polyethylene.

* * * * *